United States Patent
Yamada

(10) Patent No.: US 6,975,807 B2
(45) Date of Patent: Dec. 13, 2005

(54) VIDEO TAPE RECORDER

(75) Inventor: Ichiro Yamada, Kobe (JP)

(73) Assignee: Sanyo Electric Co., Ltd., Osaka (JP)

(*) Notice: Subject to any disclaimer, the term of this patent is extended or adjusted under 35 U.S.C. 154(b) by 1070 days.

(21) Appl. No.: 09/731,728

(22) Filed: Dec. 8, 2000

(65) Prior Publication Data

US 2001/0003551 A1 Jun. 14, 2001

(30) Foreign Application Priority Data

Dec. 10, 1999 (JP) ............................ 11-351646

(51) Int. Cl.⁷ .............................................. H04N 5/91
(52) U.S. Cl. ............................ 386/46; 386/72; 360/53; 360/55
(58) Field of Search ............................ 386/46, 68, 72, 386/80; 360/31, 53, 61, 55, 54, 64; H04N 5/91

(56) References Cited

U.S. PATENT DOCUMENTS

| | | | | |
|---|---|---|---|---|
| 4,607,297 A | * | 8/1986 | Sonoda et al. | 360/55 |
| 4,658,319 A | * | 4/1987 | Tripp et al. | 386/93 |
| 5,193,033 A | * | 3/1993 | Shimoi et al. | 360/31 |
| 5,978,171 A | * | 11/1999 | Shimura | 360/70 |
| 6,160,673 A | * | 12/2000 | Izumi et al. | 360/46 |
| 6,173,111 B1 | * | 1/2001 | Kwon et al. | 386/68 |
| 6,336,001 B1 | * | 1/2002 | Kawamura et al. | 386/85 |

FOREIGN PATENT DOCUMENTS

| | | |
|---|---|---|
| JP | 7-153142 | 6/1995 |
| JP | 7-282490 | 10/1995 |
| JP | 10-91531 | 4/1998 |

OTHER PUBLICATIONS

Copy of Great Britain Patent Office Communication including search report for corresponding Great Britain Patent Application No. GB 0101741.7 dated Dec. 10, 2001.

* cited by examiner

Primary Examiner—Vincent Boccio
(74) Attorney, Agent, or Firm—Westerman, Hattori, Daniels & Adrian, LLP

(57) ABSTRACT

A video tape recorder includes a rotary cylinder of double-azimuth four-head structure having a pair of main heads and a pair of subheads. When it is detected base on an envelop signal that clogging or the like occurs in the pair of main heads, a controller performs a head change so as to record a video signal by using the pair of subheads, and changes a phase of a control signal that is to be recorded on a magnetic tape by 180 degrees.

5 Claims, 4 Drawing Sheets

VIDEO TAPE RECORDER

BACKGROUND OF THE INVENTION

1. Field of the Invention

The present invention relates to a video tape recorder, and more specifically, a video tape recorder which is suitable for being utilized as a watching and recording apparatus in a room or building of a bank, store or shop and etc.

2. Description of the Prior Art

In order to watch and record an inside of a room or building of a bank, store or shop and etc., a video tape recorder is utilized. In such a kind of video tape recorder, in view of a purpose thereof, it is necessary to stubbornly avoid a situation that the video record becomes disable by a failure of the recording head due to the clogging or the like.

Hitherto, a rotary head cylinder having so-called double-azimuth four-head structure is well-known. In such the double-azimuth four-head structure, as shown in FIG. 5, a head SP (+) and a head EP (+) have plus azimuth angles, respectively, and a head SP (−) and a head EP (−) have minus azimuth angles, respectively. The heads SP (+) and SP (−) are arranged back to back with an interval of 180 degrees, and the heads EP (+) and EP (−) are arranged back to back with an interval of 180 degrees. Furthermore, the heads SP (+) and EP (−) are positioned close to each other, and the heads SP (−) and EP (+) are positioned close to each other.

The heads SP (+) and SP (−) are utilized as main heads, and if the video record is performed by utilizing the sub-heads EP (+) and EP (−) when the clogging or the like occurs in the main heads, it is possible to continue the video record, and therefore, such the video tape recorder is useful for the watching and recording apparatus.

In reproducing by the main heads SP(+) and SP(−) the magnetic tape on which the video signal is thus recorded by using the both of the main heads and the subheads, a portion that the video signal is recorded by the main heads SP (+) and SP (−) can be reproduced well, but it is difficult to reproduce a portion that the video signal is recorded by the subheads EP (+) and EP (−) with no operation.

Therefore, it is necessary to operate the video tape recorder such that the portion that the video signal is recorded by the subheads EP (+) and EP (−) can be reproduced by using the subheads EP (+) and EP (−). In other words, there is a problem that if and when the main heads go wrong and thus the video signal is to be recorded by the subheads and the video signal recorded by the subheads is reproduced by the main heads as in a normal reproducing state after the main heads have been repaired, or in other video tape recorders having the same head structure, the video signal cannot be reproduced well.

SUMMARY OF THE INVENTION

Therefore, a principal object of the present invention is to provide a novel video tape recorder.

Another object of the present invention is to provide a video tape recorder in which it is possible to correctly reproduce the video signal recorded by the subheads by using the main heads.

A video tape recorder according to the present invention comprises: a first head having a plus azimuth angle and a second head having a minus azimuth angle, the first head and the second head being arranged back to back with an interval of 180 degrees, and constituting a first head pair; a third head having a plus azimuth angle and a fourth head having a minus azimuth angle, the third head and the fourth head being arranged back to back with an interval of 180 degrees, and constituting a second head pair; a rotary head cylinder on which the first to fourth heads are arranged in a manner that the first head and the fourth head are positioned close to each other and the second head and the third head are positioned close to each other; a detection means which detects that one of the first head pair and the second head pair goes wrong during a time that a video signal is being recorded on a magnetic tape by using the one of the first head pair and the second head pair; a head schange means which performs a head change in response to detection by the detection means so as to continue a video record by using another of the first head pair and the second head pair; and a phase change means which changes a phase of a control signal that is to be recorded on the magnetic tape at a time that the head change is performed.

In an embodiment, when the first head pair is used as the main heads and the main heads go wrong due to clogging or the like, it is possible to perform the video record by using the second head pair, and thus, it is possible to continue the video record, and accordingly, a video tape recorder according to the present invention is useful for the watching and recording apparatus.

Then, if and when the head change is performed, the phase of the control signal that is to be recorded on the magnetic tape is changed, and therefore, even if the video signal recorded by the second head pair is reproduced by using the first head pair as in a normal reproducing state, it is possible to reproduce the video signal well.

A changing amount of the phase of the control signal by the phase change means may be 180 degrees. In such a case, since the first head and the second head of the first head pair and the third head and the fourth head of the second head pair are arranged in different positions, respectively, a timing that the head enters in a video recording track on the magnetic tape slightly changed when the head change is made. However, in a case that the degree of the position difference is small, a deterioration of an image quality remains within an allowable range.

On the other hand, if and when the changing amount of the phase of the control signal is set at a value that the above-described position difference is taken into consideration on the basis of the 180 degrees, it is possible to prevent the timing that the head enters into the video recording track from being deviated.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
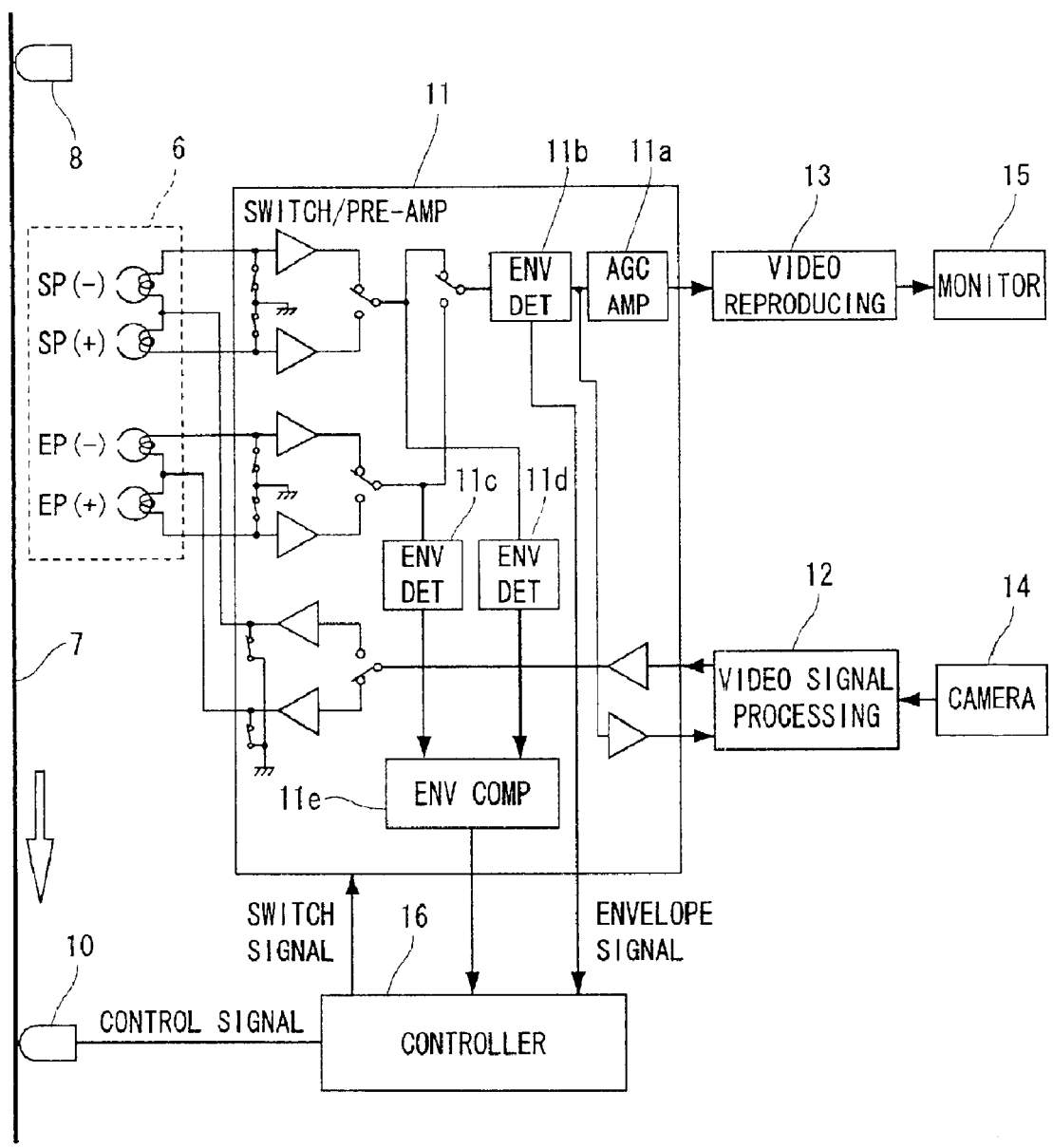
FIG. 1 is a block diagram showing main structure of a video tape recorder of one embodiment according to the present invention.
Figure 2A:
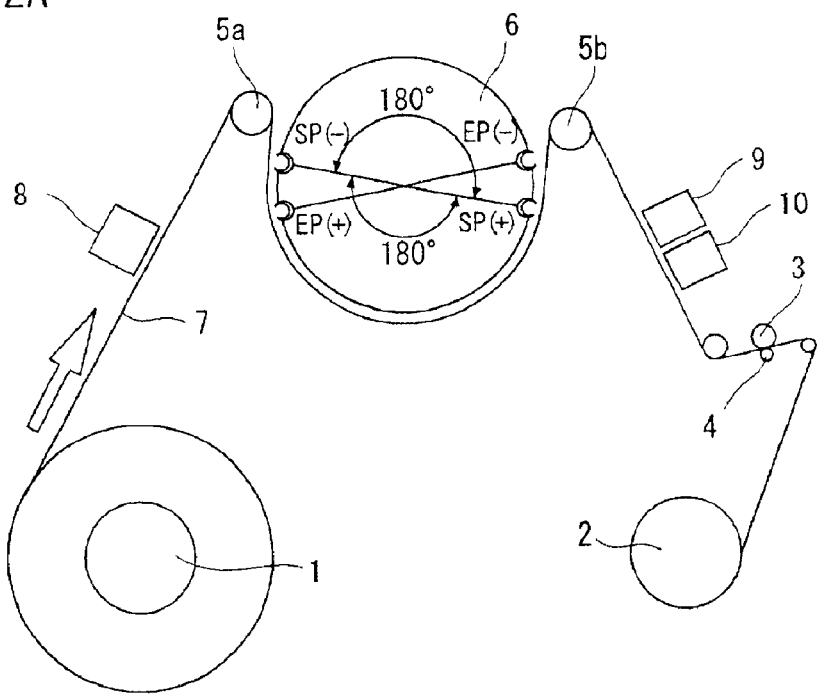
FIG. 2A is an illustrative view showing a running system of a magnetic tape.

Referring to FIG. 1, a camera 14 is provided in necessary places in a store or shop, and a color video signal outputted from the camera 14 is supplied to a video signal processing circuit 12, and then, applied to a rotary head cylinder 6 through a switch/pre-amplifier circuit 11. As shown in FIG. 2A, on the rotary head cylinder 6, a first magnetic head, i.e. a head SP (+), a second magnetic head, i.e. a head SP (−), a third magnetic head, i.e. a head EP (+) and a fourth magnetic head, i.e. a head EP (−) are provided. The first magnetic head SP (+) and the second magnetic head SP (−) constitute a first head pair, and the third magnetic head EP (+) and the fourth magnetic head EP (−) constitute a second head pair. In this embodiment shown, the heads SP (+) and SP (−) of the first head pair function as main heads, and the heads EP (+) and EP (−) of the second head pair function as subheads. Then, respective signal lines of the heads SP (+), SP (−), EP (+) and EP (−) are connected to the switch/pre-amplifier circuit 11 via a rotary transformer (not shown).

In recording a video signal, one of the first head pair constituted by the heads SP (+) and SP (−) and the second head pair constituted by the heads EP (+) and EP (−) is selected. To the two heads in the selected pair, the video signal to be recorded is alternately applied from the video signal processing circuit 12. In a time-lapse record for which the video tape recorder of this embodiment is favorably utilized, there is a long-time recording mode in which the video record can be performed at a slower tape running speed by performing a field sampling at every three (3) fields, for example. The formation of the video signal supplying path in the switch/pre-amplifier circuit 11 and the head selection is controlled by a switch signal from a controller 16 which is a microcomputer, for example.

In reproducing, a reproduced signal outputted by the pair of heads SP (+) and SP (−) or the heads EP (+) and EP (−) which trace the vide recording tracks is amplified by a predetermined level by means of an AGC amplifier 11a, and this amplified reproduced signal is supplied to a video reproducing circuit 13. The video reproducing circuit 13 converts the reproduced signal into a video signal and apply the video signal to a monitor 15. The formation of the reproduced signal supplying path in the switch/pre-amplifier circuit 11 and the head selection is controlled by the switch signal from the computer or controller 16.

As shown in FIG. 2A, the magnetic tape 7 on a supply reel 1 is wound around a peripheral surface of the rotary head cylinder 6 in a range of approximately 180 degrees by guide posts 5a and 5b, and the magnetic tape 7 is sandwiched by a pinch roller 3 and a capstan 4, and therefore, the magnetic tape 7 runs at a predetermined speed according to a rotation of the capstan 4, and then, wound-up on a winding reel 2 being rotated in a winding-up direction. On the peripheral surface of a rotary drum of the rotary head cylinder 6, the aforementioned heads SP (+), SP (−), EP (+) and EP (−) are provided in a manner that the heads SP (+) and EP (−) are positioned close to each other and the heads SP (−) and EP (+) are positioned close to each other. Azimuth angles of the heads SP (+) and EP (+) are set at a plus side, and azimuth angles of the heads SP (−) and EP (−) are set at a minus side. The heads SP (+) and SP (−) are arranged back to back with an interval of 180 degrees, and the heads EP (+) and EP (−) are arranged back to back is an interval of 180 degrees. In addition, in this embodiment shown, head widths of the heads SP (+), SP (−), EP (+) and EP (−) are set at the same value.

In a path between the supply reel 1 and the guide post 5a, an all erase head 8 having a head width in correspondence to a tape width of the magnetic tape 7 is provided to be contacted to the magnetic tape 7. Furthermore, in a path between the guide post 5b and the winding reel 2, a sound erase head 9 for erasing a sound signal and a sound/control head 10 are provided so as to be contacted to the magnetic tape 7, respectively. The sound/control head 10 performs a record and a reproduction of the sound signal at one side end of the tape 7, and a record and a reproduction of the control signal at another side end of the tape 7.

Figure 2B:
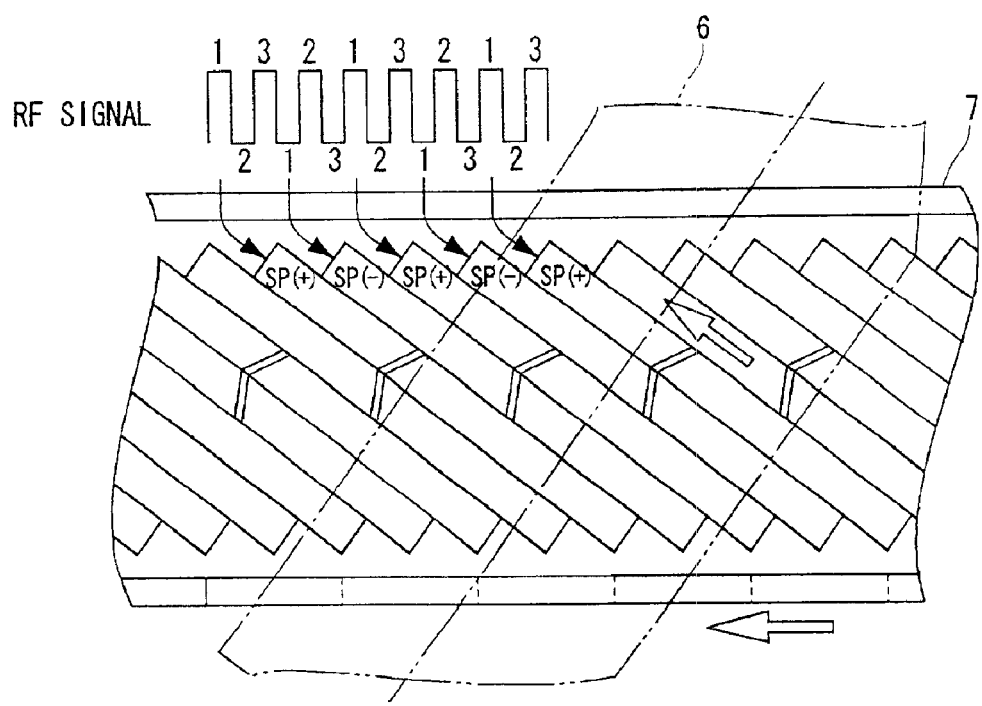
FIG. 2B is an illustrative view showing video recording tracks on the magnetic tape.

As shown in FIG. 2B, by a herycal-scanning by the rotary head cylinder 6, the video recording tracks are formed on the magnetic tape 7 in slant, and the control signal and the sound signal are recorded at a position prior to such the video record tracks.

FIG. 2B shows a long-time recording mode wherein by making the tape running speed slow, the field sampling is performed at every three (3) fields. Numerals "1", "2" and "3" are added on an RF signal that is produced on the basis of a vertical synchronization signal of the video signal. At a timing of the numeral "1", the field sampling is performed so as to record the video signal by alternately using the heads SP (+) and SP (−), and therefore, the video recording tracks having the azimuth angles different from each other are sequentially formed adjacently. In addition, the period of the field sampling is not limited to the three (3) fields, and the field sampling may be performed at every odd number fields so as to perform the time lapse record by using the heads SP (+) and SP (−) alternately.

Furthermore, in a case of an NTSC system, in recording the video signal, the control signal is produced by utilizing the vertical synchronization signal for each approximately 1/60 seconds (correctly 1/59.94 seconds). In the azimuth recording, the head having the plus azimuth angle and the head having the minus azimuth angle must trace correct video recording tracks, respectively, and therefore, the period of the control signal is approximately 1/30 second, i.e. two (2) fields. That is, the control signal is a signal having a one-frame period in synchronous with the video signal.

In reproducing, a servo-control is performed such that the timing of the control signal against the capstan motor which feeds the tape and the timing of the rotary head cylinder 6. For example, in response to a rising edge of the control signal, the head SP (+) traces the video recording track of the plus azimuth angle, and in response to a falling edge of the control signal after approximately 1/60 seconds, the head SP (−) traces the video recording track of the minus azimuth angle, and furthermore, in response to a rising edge of the control signal occurs after approximately 1/60 seconds, the head SP (+) traces the video recording track having the plus azimuth angle, and so on.

Based upon whether or not an output (an envelope signal) of an envelope detection circuit 11b provided in the switch/pre-amplifier circuit 11 shown in FIG. 1 is higher than a predetermined level, it is possible to detect a head failure due to the clogging of the head. Furthermore, by comparing in a comparison circuit 11e an output of an envelope detection circuit 11c and an output of an envelope detection circuit 11d with each other, it is possible to control a head change in that a head outputting of a larger signal is selected, for example.

If and when the controller 16 detects the head failure on the basis of the output (the envelope signal) of the envelope detection circuit 11b, the controller 16 applies a switch signal to the switch/pre-amplifier circuit 11 such that the video record can be performed by using the other pair of heads instead of the one pair of heads having been used until that time. At this time, the controller 16 applies the processing on the production of the control signal to be supplied to the sound/control head 10.

Figure 3:
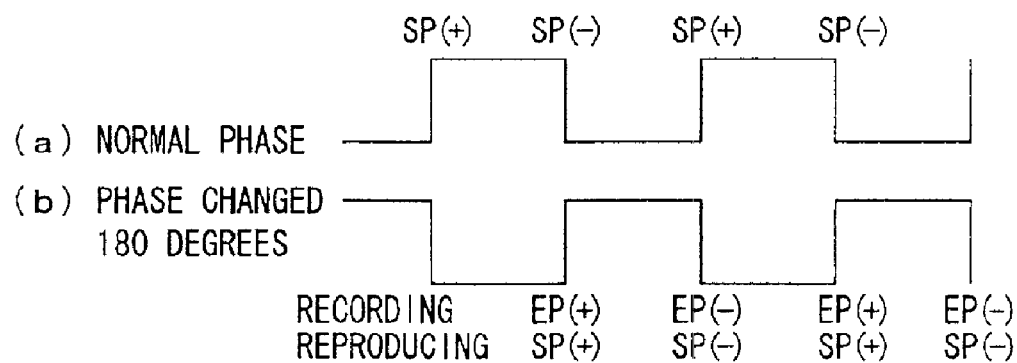
FIG. 3 is an illustrative view showing a phase change of a control signal.
Figure 5:
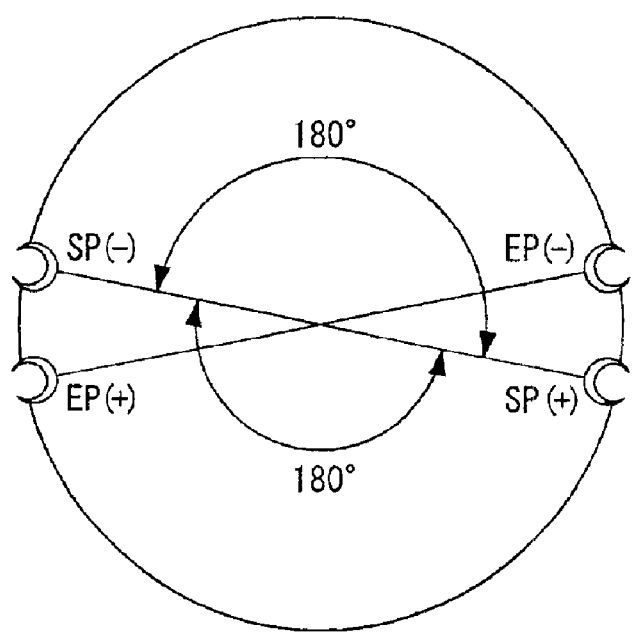
FIG. 5 is a plan view showing a rotary head cylinder of souble-azimuth four-head structure.

More specifically, if the controller 16 makes the head change from the one head pair to the other head pair, the controller 16 changes a phase of the control signal by a predetermined angle, 180 degrees, for example in the embodiment shown. That is, if the control signal is generated as shown in FIG. 3(*a*), the control signal having a phase changed by 180 degrees becomes as shown in FIG. 3(*b*). The phase of the control signal can be changed by changing a rising timing on the basis of the vertical synchronization signal, for example.

In addition, in a case where a changing amount of the phase is set at 180 degrees, due to the positional difference or deviation between adjacent two (2) heads SP (+) and EP (−) against the heads SP (−) and EP (+), timings that the heads enter into the video recording tracks are slightly deviated. However, in a case that the degree of the positional deviation or difference is small (few horizontal periods, for example), the deterioration of the image quality remain within the allowable range.

Furthermore, in order to prevent the timings that the heads enter into the video recording tracks due to the above-described positional deviation of the heads from being deviated, the changing amount of the phase of the control signal may be set at a value that the above-described positional deviation of the heads is taken into consideration while the 180 degrees are standard. That is, the rising timing of the control signal may be set at 180 degrees+α or 180 degrees−α. In such a case, "α" is an angle difference equal to the positional difference or deviation of the heads.

Figure 4A:
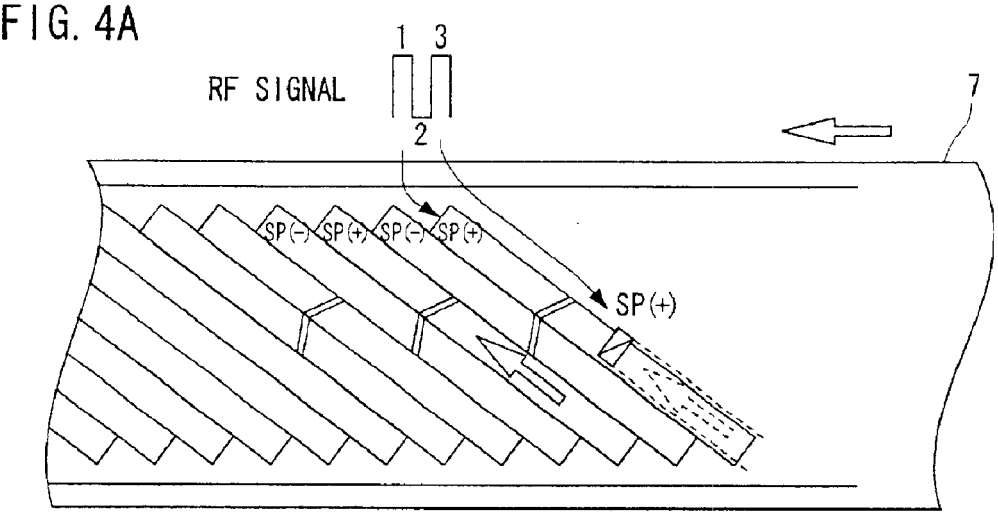
FIG. 4A–FIG. 4C are illustrative views showing a manner of a head change.

FIG. 4A shows a manner that the recording operation using the heads SP (+) and SP (−) is performed, and the heads SP (+) and SP (−) having the same azimuth angles and arriving after approximately one frame period (at the timing of the numeral "3") are utilized as the reproducing heads, and the detection of the head failure in accordance with the envelope signal from the envelope detection circuit 11*b* shown in FIG. 1 is performed. If the failure occurs in the heads SP (+) and SP (−) due to the clogging or the like, under the control of the controller 16, the heads EP (+) and EP (−) are utilized for recording instead of the heads SP (+) and SP (−) which have been used until that time.

Figure 4B:
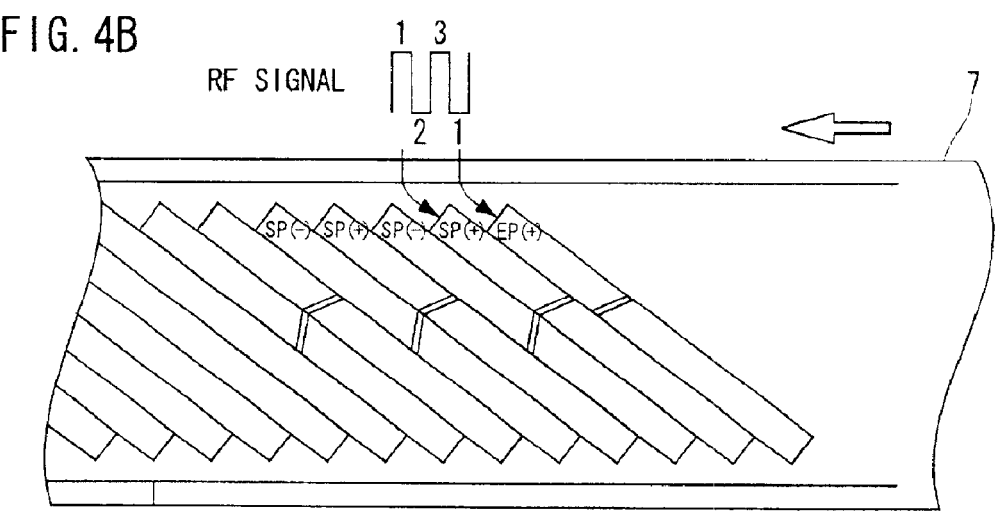

More specifically, as shown in FIG. 4B, the video signal obtained by performing the field sampling at a next timing of the numeral "1" becomes to be recorded by the head EP (+) provided in adjacent to the head SP (−) that must bear the recording preliminarily. Then, as shown in FIG. 4C, the recording is performed by alternately using the heads EP (+) and EP (−) thereafter, and the control signal that is to be recorded on the lower side end of the magnetic tape 7 is changed in the phase of 180 degrees or approximately 180 degrees from the period during which the heads SP (+) and SP (−) are utilized (indicated by a solid line) to the timing indicated by a dotted line.

Therefore, at a time that the magnetic tape 7 thus recorded is reproduced by a video tape recorder having the main head SP (+) and SP (−) being not in failure, or a video tape recorder that the heads SP (+) and SP (−) becomes in a normal state, in response to the rising timing of the control signal, the head SP (+) traces the video recording track having the symbol of "SP (+)", and after approximately 1/60 seconds, the head SP (−) traces the video recording track having the symbol of "SP (−)", and after further approximately 1/60 seconds, the head SP (+) traces the video recording track on which the symbol "SP (+)" is added.

Figure 4C:
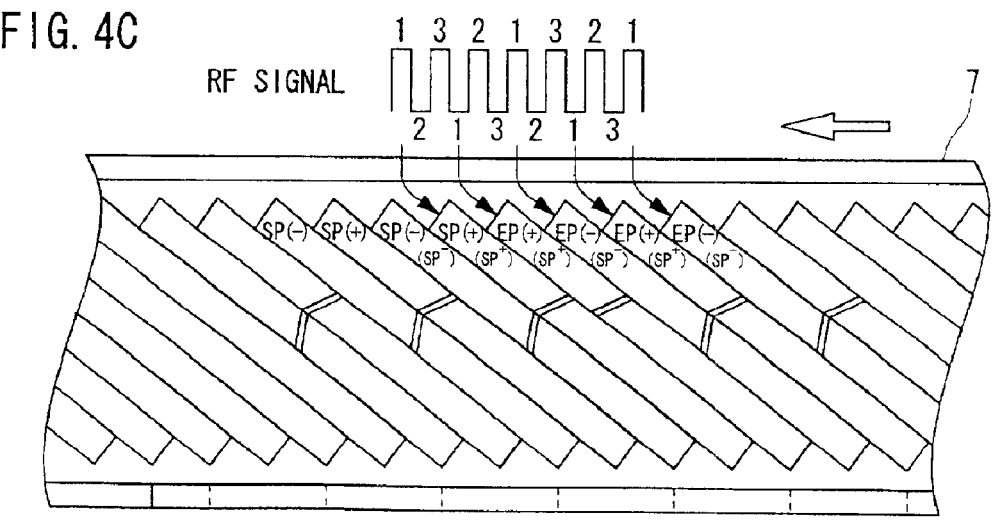

In contrast, in an area or region that the video record is performed by the heads EP (+) and EP (−), the phase of the control signal is changed by 180 degrees or approximately 180 degrees, in response to the rising timing of the control signal, the head SP (+) (represented as "SP (+)" in FIG. 4C) starts the tracing of the video recording track having the symbol of "EP (+)", and after approximately 1/60 seconds, the head SP (−) represented as "SP (+)" in FIG. 4C starts the tracing of the video recording track having the symbol of "EP (−)", and furthermore, in response to the rising timing of the control signal that occurs after approximately 1/60 seconds, the head SP (+) starts the tracing of the video recording track having the symbol of "EP (+)".

Thus, even if one of the first head pair and the second head pair having been used for video recording, it is possible to continue the video record by using the other of the first head pair and the second head pair. Then, if the head change is performed, the phase of the control signal is also changed, and therefore, the video signal recorded by the above-described other head pair can be normally reproduced by using the above-described one head pair.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video tape recorder, comprising:
    a first head having a plus azimuth angle and a second head having a minus azimuth angle, the first head and the second head being arranged back to back with an interval of 180 degrees, and constituting a first head pair;
    a third head having a plus azimuth angle and a fourth head having a minus azimuth angle, the third head and the fourth head being arranged back to back with an interval of 180 degrees, and constituting a second head pair;
    a rotary head cylinder on which the first to fourth heads are arranged in a manner that the first head and the fourth head are positioned close to each other and the second head and the third head are positioned close to each other;
    a detection means which detects that one of the first head pair and the second head pair goes wrong during a time that a video signal is being recorded on a magnetic tape by using the one of the first head pair and the second head pair;
    a head change means which performs a head change in response to detection by the detection means so as to continue a video record by using another of the first head pair and the second head pair; and
    a phase change means which changes a phase of a control signal that is to be recorded on the magnetic tape at a time that the head change is performed.

2. A video tape recorder according to claim 1, wherein a changing amount of the phase of the control signal by the phase change means is 180 degrees.

3. A video tape recorder according to claim 1, wherein a changing amount of the phase of the control signal is set based upon a positional difference between two heads adjacent to each other.

4. A video tape recorder including a controller, comprising:
- a first head having a plus azimuth angle and a second head having a minus azimuth angle, the first head and the second head being arranged back to back with an interval of 180 degrees, and constituting a first head pair;
- a third head having a plus azimuth angle and a fourth head having a minus azimuth angle, the third head and the fourth head being arranged back to back with an interval of 180 degrees, and constituting a second head pair; and
- a rotary head cylinder on which the first to fourth heads are arranged in a manner that the first head and the fourth head are positioned close to each other and the second head and the third head are positioned close to each other, wherein
  - said controller performs a head change to continue a video record by using one of the first head pair and the second head pair and changes a phase of a control signal that is to be recorded on the magnetic tape when it is detected that other of the first head pair and the second head pair goes wrong during a time that a video signal is being recorded on a magnetic tape by using the other of the first head pair and the second head pair.

5. A control method of a video tape recorder having double-azimuth four-head structure, comprising steps of:
- (a) detecting one of a first head pair and a second head pair goes wrong during a time that a video signal is being recorded on a magnetic tape by using the one of the first head pair and the second head pair;
- (b) performing a head change to continue a video record by using other of the first head pair and the second head pair; and
- (c) changing a phase of a control signal that is to be recorded on the magnetic tape.

* * * * *